United States Patent
Foerster et al.

(10) Patent No.: US 8,942,904 B2
(45) Date of Patent: Jan. 27, 2015

(54) EMERGENCY BRAKE ASSISTANCE SYSTEM FOR ASSISTING A DRIVER OF A VEHICLE WHEN SETTING THE VEHICLE IN MOTION

(75) Inventors: Daniel Foerster, Darmstadt (DE); Michael Klug, Wangen (DE); Andreas Hartmann, Schemmerhofen-Assmannshardt (DE); Thomas Weiss, Niedernhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 247 days.

(21) Appl. No.: 13/514,375

(22) PCT Filed: Dec. 7, 2010

(86) PCT No.: PCT/DE2010/001420
§ 371 (c)(1),
(2), (4) Date: Jun. 27, 2012

(87) PCT Pub. No.: WO2011/069489
PCT Pub. Date: Jun. 16, 2011

(65) Prior Publication Data
US 2012/0265418 A1 Oct. 18, 2012

(30) Foreign Application Priority Data
Dec. 10, 2009 (DE) .......................... 10 2009 057 836

(51) Int. Cl.
*B60T 7/12* (2006.01)
*B60W 30/16* (2012.01)
(Continued)

(52) U.S. Cl.
CPC ...... *B60W 30/16* (2013.01); *B60T 7/22* (2013.01); *B60W 10/06* (2013.01);
(Continued)

(58) Field of Classification Search
CPC ......... B60T 8/32; B60T 8/3205; B60T 8/321; B60T 8/17; B60T 7/22; B60W 10/06; B60W 10/184; B60W 30/09; B60W 30/16; B60W 50/14; G08G 1/16

USPC .................. 701/70; 477/182; 180/282
See application file for complete search history.

(56) References Cited

U.S. PATENT DOCUMENTS 5,590,937 A * 1/1997 Heibel .......................... 303/125
5,607,209 A * 3/1997 Narita et al. ............. 303/122.11
(Continued)

FOREIGN PATENT DOCUMENTS

DE 102005033087 1/2007
EP 2 028 632 2/2009
(Continued)

OTHER PUBLICATIONS

International Search Report of the International Searching Authority for International Application PCT/DE2010/001420, mailed Apr. 12, 2011, 2 pages, European Patent Office, HV Rijswijk, Netherlands.
(Continued)

*Primary Examiner* — Tuan C. To
(74) *Attorney, Agent, or Firm* — W. F. Fasse

(57) ABSTRACT

An emergency brake assistance system includes: a collision risk detection unit (12) to detect a risk of collision with an object in front of the vehicle, based on data from an environment sensor (14) for recording objects in front of the vehicle and data from an accelerator sensor (16) for recording an intention to accelerate by the driver; and a collision avoidance unit (18) to implement measures to prevent a potential collision with the object in front of the vehicle, based on data from the collision risk detection unit. The system temporarily deactivates, for a specified time duration, an override condition of a safety concept of the system when the accelerator sensor records the driver's intention to accelerate and the vehicle speed is below a specified speed threshold. Thus the driver's acceleration command when setting the vehicle in motion temporarily cannot override an automatic actuation of the emergency brake system.

14 Claims, 1 Drawing Sheet

(51) Int. Cl.
  *B60T 7/22*    (2006.01)
  *B60W 10/06*   (2006.01)
  *B60W 10/184*  (2012.01)
  *B60W 30/09*   (2012.01)
  *G08G 1/16*    (2006.01)
  *B60W 50/14*   (2012.01)

(52) U.S. Cl.
  CPC ............ *B60W 10/184* (2013.01); *B60W 30/09* (2013.01); *G08G 1/16* (2013.01); *B60W 50/14* (2013.01)
  USPC .......................... 701/70; 477/182; 180/282

(56) References Cited

U.S. PATENT DOCUMENTS

| | | | |
|---|---|---|---|
| 7,027,920 B2 | 4/2006 | Madau | |
| 7,425,043 B2 * | 9/2008 | Doerr et al. ................ | 303/193 |
| 8,198,995 B2 * | 6/2012 | Gross et al. ................ | 340/467 |
| 2005/0127749 A1 | 6/2005 | Hartmann et al. ........... | 303/122 |
| 2005/0162012 A1 * | 7/2005 | Sakai et al. ................ | 303/191 |
| 2007/0297288 A1 | 12/2007 | Boecker et al. | |
| 2009/0038873 A1 * | 2/2009 | Lucas et al. ................ | 180/275 |
| 2009/0045932 A1 * | 2/2009 | Petersen .................... | 340/467 |
| 2009/0065273 A1 * | 3/2009 | Wyatt et al. ................ | 180/65.8 |
| 2009/0261963 A1 * | 10/2009 | Ault ........................... | 340/467 |
| 2010/0006363 A1 * | 1/2010 | Zagorski .................... | 180/275 |
| 2010/0025141 A1 * | 2/2010 | Bensch et al. ............... | 180/271 |
| 2010/0063736 A1 * | 3/2010 | Hoetzer ....................... | 701/301 |
| 2010/0085171 A1 * | 4/2010 | Do .............................. | 340/426.1 |
| 2010/0134263 A1 | 6/2010 | Mathony et al. | |
| 2011/0080302 A1 * | 4/2011 | Muthaiah et al. ............ | 340/903 |
| 2011/0105097 A1 * | 5/2011 | Tadayon et al. .............. | 455/418 |

FOREIGN PATENT DOCUMENTS

| | | |
|---|---|---|
| GB | 2 309 555 | 7/1997 |
| JP | H04-039957 U | 4/1992 |
| JP | H05-256170 A | 10/1993 |
| JP | H10-151964 A | 6/1998 |
| JP | 2005-035535 A | 2/2005 |
| JP | 2009-500243 A | 1/2009 |
| JP | 2009-057893 A | 3/2009 |

OTHER PUBLICATIONS

English Translation of PCT International Preliminary Report on Patentability of the International Searching Authority for International Application PCT/DE2010/001420, mailed Aug. 16, 2012, 7 pages, International Bureau of WIPO, Geneva, Switzerland.

* cited by examiner

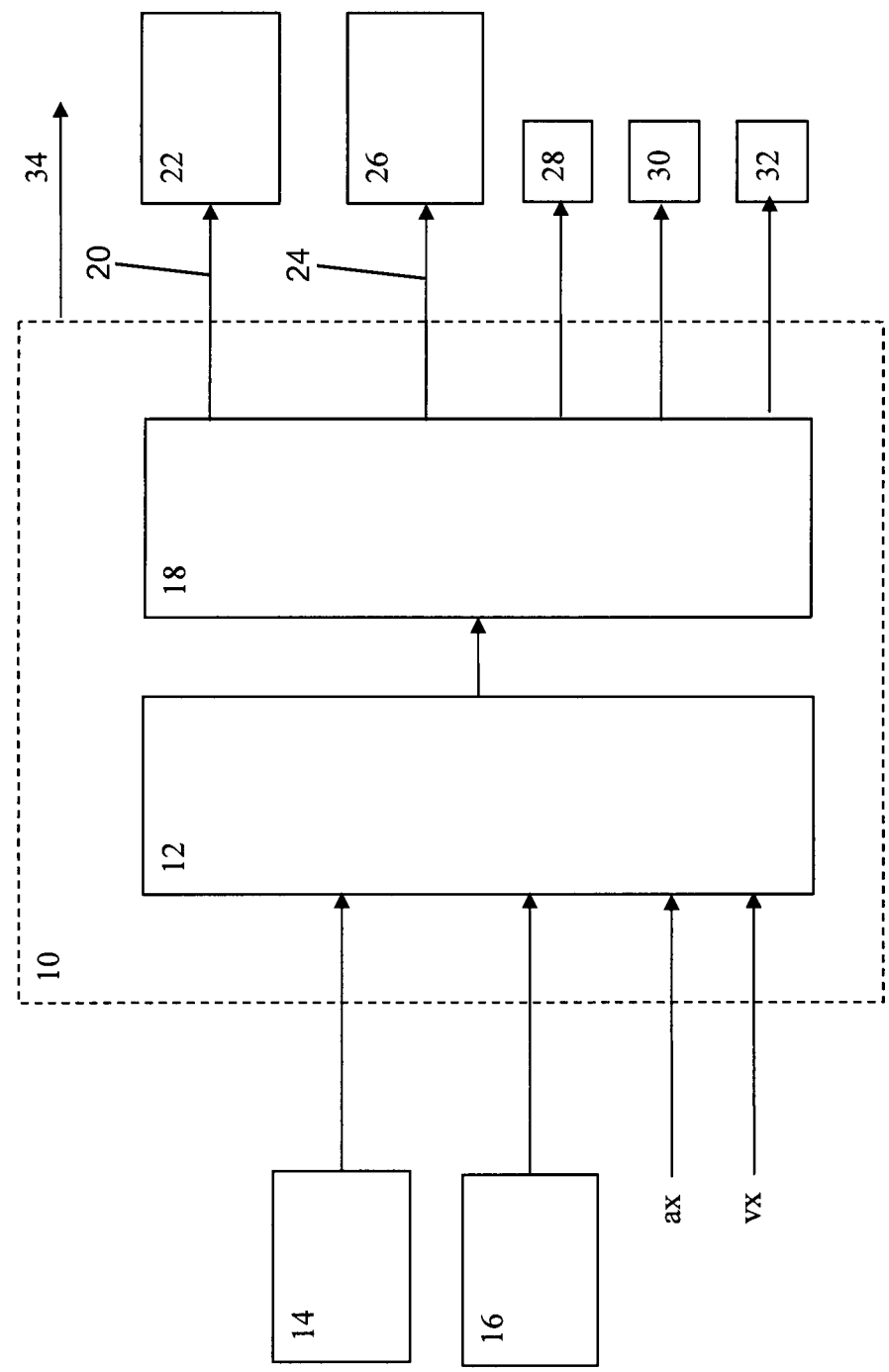

EMERGENCY BRAKE ASSISTANCE SYSTEM FOR ASSISTING A DRIVER OF A VEHICLE WHEN SETTING THE VEHICLE IN MOTION

FIELD OF THE INVENTION

The invention relates to an emergency brake assistance system for assisting a driver of a vehicle when setting the vehicle in motion.

BACKGROUND INFORMATION

Emergency brake assistance systems (EBA) based on environment sensor systems and which are currently available on the market assist drivers of a vehicle when there is the risk of a rear-end collision and the driver reacts too late or incorrectly, or not at all. Assistance can be provided by activating a visual, acoustic and/or haptic warning, by a (partially) autonomous braking intervention or during a braking intervention by the driver.

The speed range within which such systems are generally active is typically between 30 km/h and 180 km/h (CMS: Collision Mitigation Brake System; CMBB: Collision Mitigation By Braking; CMBS: Collision Mitigation Brake System by car manufacturer Honda).

Recently, systems have appeared on the market which are already active from approximately 0 km/h, for example the Pre-Safe brake used in the S-class range by car manufacturer Mercedes-Benz or the City Safety system by car manufacturer Volvo (such as in the XC60 model), which is active from approximately 0 km/h to approximately 30 km/h.

One key factor in the system design of emergency brake assistance systems is the avoidance of and dealing with erroneous activations. Due to the deficits of environment sensor systems and interpretation, such activations cannot be ruled out, in particular since the signal quality of the environment sensor system is generally only categorised as QM (Quality Management), i.e. as not relevant to safety as specified in ISO 26262; at the most, it is categorised as ASIL (Automotive Safety Integrity Level) level A as specified in ISO 26262.

Erroneous activations can occur depending on the environment sensor system used, in particular at low speeds. In addition, depending on the environment sensor system used, objects which are a priori at standstill present problems, and may be the cause of an erroneous activation. This applies in particular to the radar sensor systems generally used today for emergency brake assistance systems.

Driver reactions and predicted actions such as steering, indicating, braking and accelerating are also incorporated in the activation and cancellation concept of emergency brake assistance systems.

A further safety concept is that, when an intention to cancel is detected, or a traffic situation is detected in which it cannot be assumed that an intention to activate will arise, activation must be cancelled or suppressed. This safety target is classified as SIL3 according to the SIL (Security Integrity Level) standard or ASIL level D, and is recognised throughout the industry. Both a cancellation and a suppression of activation generally occur when the driver actuates the accelerator in the positive direction. An intention to accelerate or set the vehicle in motion on the part of the driver is interpreted as "not intending to brake", in particular when "kick-down" is in operation (the driver treads fully on the accelerator). For this purpose, the gradient and/or absolute value of the accelerator activation is in most cases evaluated on the basis of an interpretation threshold.

SUMMARY OF THE INVENTION

An object of the present invention is now to provide an emergency brake assistance system for assisting a driver of a vehicle when setting the vehicle in motion.

This object is attained by an embodiment of an emergency brake assistance system for assisting a driver of a vehicle when setting the vehicle in motion, with features according to at least one embodiment of the present invention.

An underlying principle of an embodiment of the invention is to additionally provide an emergency brake assistance feature for a driver when accelerating. As explained in the introduction, with standard emergency brake assistance concepts, activation of the emergency brake assistance function is usually deactivated or suppressed by acceleration, which can however be disadvantageous, particularly when setting the vehicle in motion, if for example a driver incorrectly assesses a traffic situation and e.g. activates the accelerator while failing to notice that the leading vehicle directly in front of his own subject vehicle is at standstill, or that such leading vehicle decelerates or accelerates less than his own vehicle, thus causing a rear-end collision with the leading vehicle. Traffic situations such as these occur frequently on motorways where roadworks are being conducted and no acceleration lane is provided. In such situations, a driver must simultaneously assess the traffic coming from behind on the target lane and the vehicle driving in front of his vehicle. Here, rapid acceleration is frequently required, and this can lead to high tension levels and errors. The driver of the subject vehicle, and the driver of the leading vehicle driving in front, sometimes interpret these situations differently, wherein the driver of the subject vehicle usually assumes that the leading vehicle driving in front will accelerate. If this is not the case, or if the leading vehicle driving in front suddenly ceases to accelerate, then a rear-end collision may occur. Here, an aim of an embodiment of the invention is to provide assistance by detecting the risk of collision on the basis of data gathered by an environment sensor system and an accelerator sensor system, and conducting one or more measures in order to avoid a potential collision, thus assisting the driver. Here, setting the vehicle in motion is defined as acceleration from standstill or from a low vehicle speed. An embodiment of the invention addresses in particular the accident situation described above in which a rear-end collision occurs when setting the vehicle in motion, which is not covered by the standard systems known from the prior art for failsafe reasons (in order to fulfil the functional safety requirements specified in ISO 26262).

The present invention now, according to one embodiment, relates to an emergency brake assistance system for assisting a driver of a vehicle when setting the vehicle in motion, comprising a collision risk detection unit which is designed to detect a risk of collision with an object in front of the vehicle, based on data from an environment sensor system for recording objects in front of the vehicle and data from an accelerator sensor system for recording an intention to accelerate by the driver, and a collision avoidance unit which is designed to implement measures to prevent a potential collision with the object in front of the vehicle, based on data from the collision risk detection unit, wherein the emergency brake assistance system is designed to temporarily implement, for a specified time duration, a deactivation of a cancellation and activation-suppression condition of a safety concept when recording an intention to accelerate by the driver at a vehicle speed which is lower than a specified speed threshold.

As a result, the emergency brake assistance function according to this embodiment of the invention can be operated together with an existing safety concept which deactivates or suppresses the activation of an emergency brake assistance function when an intention to accelerate is detected, without putting the overall safety concept at risk or even deactivating it entirely.

The collision risk detection unit can be designed
to estimate a vehicle acceleration within an adaptable time frame, based on the data from the accelerator sensor system, and
to detect the risk of collision with an object in front of the vehicle when the estimated vehicle acceleration gives cause to anticipate that a collision with the object will occur.

The collision risk detection unit can also be designed
to calculate a time ttc until collision occurs, a time ttb until the required braking manoeuvre should be conducted, a time tts until the required steering manoeuvre should be conducted and/or a necessary deceleration a_nec in order to avoid the collision, based on the data from the environment sensor system and the accelerator sensor system, and
to evaluate the risk of collision with an object in front of the vehicle based on one or more of these calculated values.

The collision avoidance unit can be designed to implement one or more of the following actions as measures to prevent a potential collision with the object in front of the vehicle:
output of a brake intervention signal in order to trigger an electronic brake system, in particular for an autonomous, rapid and time-restricted brake intervention,
output of an acceleration block signal in order to trigger an engine control device, in particular for the suppression of the intention to accelerate for a restricted period of time,
output of a visual, acoustic and/or haptic warning for the driver.

The collision avoidance unit can furthermore be designed to output a brake intervention signal with a variable gradient and for a variable target deceleration, in particular a maximum possible deceleration.

The system can furthermore be designed to temporarily output a deactivation signal in order to deactivate a cancellation and activation suppression condition of a safety concept when recording an intention to accelerate by the driver, for a specified time duration, in particular for approximately 1 to 3 seconds.

Furthermore, the system can be designed to only output the deactivation signal when
the vehicle is at standstill, or
the vehicle speed is lower than a specified speed threshold and the acceleration of the vehicle is not negative.

Finally, the system can be designed to not output the deactivation signal when a negative acceleration of the vehicle is present.

Further advantages and possible applications of the present invention are included in the description below with reference to the exemplary embodiment(s) shown in the drawing(s).

In the description, the claims, the abstract and the drawing(s), the terms and assigned reference numerals shown in the List of Reference Numerals are used.

BRIEF DESCRIPTION OF THE DRAWINGS

The drawing(s) show in the only FIGURE a block diagram of an exemplary embodiment of an emergency brake assistance system according to the present invention.

DETAILED DESCRIPTION OF EXAMPLE EMBODIMENTS OF THE INVENTION

In the following, the same elements and/or elements with the same function may be assigned the same reference numerals. The absolute values and measurements given below are only sample values and do not represent a restriction of the invention to the same dimensions.

The only FIGURE shows an emergency brake assistance system 10 which comprises a collision risk detection unit 12 and a collision avoidance unit 18. The system 10 can for example be designed in the form of an electronic control unit (ECU) or in the form of an integrated circuit for installation in an ECU. Both units 12 and 18 of the system can be implemented in different ways, e.g. as separately integrated circuits, as function modules in an integrated circuit, or as program modules of an emergency brake assistance program which is run by a high-capacity processor of an ECU in order to implement the emergency brake assistance functions according to the invention.

The current acceleration ax and the current speed vx of the vehicle in which the emergency brake assistance system 10 is installed are conveyed to the emergency brake assistance system 10. Furthermore, the emergency brake assistance system 10, more precisely the collision risk detection unit 12, is coupled with an environment sensor system 14 and an accelerator sensor system 16 of the vehicle in order to receive data from these two sensor systems.

The emergency brake assistance system 10 can be designed to receive and process signals from further sensor systems, e.g. signals from a brake (pedal) sensor system such as from the TMC (tandem master cylinder) or from the BLS (brake light switch), a steering wheel sensor system, a wheel speed sensor system and an inertia sensor system, in particular from an ESC (Electronic Stability Control) system.

The environment sensor system 14 is provided on the front side of the vehicle in order to record an area in front of the vehicle and objects located there, such as a vehicle driving in front. Standard sensors used for driver assistance systems can be used as an environment sensor system 14, such as radar, lidar, camera and ultrasound sensors. These sensors can be used separately or in combination with each other.

The emergency brake assistance system 10 is furthermore designed to generate and output a brake intervention signal 20, an acceleration block signal 24 and a deactivation signal 34, depending on data received from the environment sensor system 14 and the accelerator sensor system 16. The brake intervention signal 20 is made available to an electronic brake system 22, e.g. via a vehicle bus system, in order to trigger it to create an (autonomous) increase in brake pressure. The acceleration block signal 24 is made available to an engine control device 26 via a vehicle bus system in order to be able to block an intended acceleration by the driver. The deactivation signal 34 is used to temporarily deactivate for a specified time period a cancellation and activation suppression condition of a safety concept when recording an intention to accelerate by the driver. This safety concept can for example be provided by an emergency brake assistance function when closely approaching vehicles moving slowly in front or standing objects, and is designed primarily to prevent the driver from causing a rear-end collision by accelerating. However, as indicated in the introduction, this is a hindrance in certain situations such as when setting the vehicle in motion, and should be deactivated in precisely this case, if only for a short period of time.

Finally, the emergency brake assistance system 10 is also designed to output a visual, acoustic and haptic warning 28, 30 and 32. The visual warning 28 can for example be provided by a warning display which lights up on the dashboard of the vehicle, the acoustic warning 30 can be provided by generating a clearly audible warning tone, and the haptic warning can be provided for example by generating vibrations in the steering wheel or accelerator pedal.

A detailed description now follows of how the data from the environment sensor system 14 and the accelerator sensor system 16 is processed by the collision risk detection unit 12 and the collision avoidance unit 18 in order to generate the signals 20, 24, 28, 30 and 32

For this purpose, the collision risk detection unit 12 evaluates the data from the environment sensor system 14 in order to ascertain whether an object, in particular a vehicle moving in front, is located within the monitoring range of the environment sensor system 14. Furthermore, the collision risk detection unit 12 evaluates the data from the accelerator sensor system 16 in order to ascertain whether it indicates an intention to accelerate by the driver. If a vehicle driving in front has been recorded, and if there is an intention to accelerate, the collision risk detection unit 12 calculates the anticipated vehicle acceleration on the basis of the data from the accelerator pedal sensor system 16 during an adaptable time window/time frame. The predicted vehicle acceleration is continuously updated during the adaptable time window. If the predicted vehicle acceleration gives cause to anticipate a collision with the vehicle moving in front, the collision risk detection unit 12 detects a collision risk. Furthermore, the collision risk detection unit 12 calculates the following from the data from the environment sensor system 14 and the predicted vehicle acceleration:

- a time period ttc until collision occurs (time to collision) with the vehicle moving in front,
- a time ttb until the required braking manoeuvre (time to brake) should be conducted in order to avoid a potential collision with the vehicle moving in front,
- A time tts until the required steering manoeuvre (time to steer) should be conducted in order to avoid the potential collision with the vehicle moving in front,
- a necessary deceleration a_nec in order to prevent the collision.

If a collision risk is detected, the collision risk detection unit 12 indicates this to the collision avoidance unit 18. Furthermore, the values ttc, ttb, tts and a_nec are also transferred to the collision avoidance unit 18.

On the basis of the received values, the collision avoidance unit 18 calculates an autonomous, rapid and time-restricted brake intervention by the electronic brake system 22, and generates a corresponding brake intervention signal 20 which is output to the brake system 22. Furthermore, the collision avoidance unit 18 generates an acceleration block signal 24 which is output to the engine control device 26. The electronic brake system 22 builds up a corresponding brake pressure in the vehicle brakes after receiving the brake intervention signal 20 in order to decelerate the vehicle in such a manner that a collision can be avoided. After receiving the acceleration block signal 24, the engine control device 26 controls the fuel feed in such a manner that the engine does not accelerate the vehicle. Furthermore, the collision avoidance unit 18 generates a visual, acoustic and haptic warning 28, 30 and 32 for the driver.

In general, the emergency brake assistance system 10 is used in conjunction with further driver assistance systems in a vehicle, in particular with the emergency brake systems described in the introduction, which are designed in particular to prevent a rear-end collision when the vehicle approaches a vehicle driving in front, e.g. at the tail end of a traffic jam or at a traffic light, at too high speed. However, in the just mentioned emergency brake system, as described in the introduction above, when the driver accelerates, i.e. when the accelerator is pressed, a brake activation is deactivated or made ineffective for failsafe reasons, therefore it is necessary, in order to ensure a smooth cooperation of such emergency brake systems with the emergency brake assistance system according to the invention, that the cancellation and activation-suppression condition "driver cancellation or intention to accelerate by corresponding actuation of the accelerator", which is necessitated by the safety concept of the emergency brake systems, is temporarily switched off or suppressed for a specific time period, so that the emergency brake assistance system 10 according to the invention can operate correctly. The time duration of the temporary shutdown can be either fixedly specified or variable, and can be independent or dependent on the state of the system or the recognition of certain traffic situations. In particular, the temporary deactivation of the cancellation and activation-suppression condition can be implemented continuously or only in certain driving situations such as situations of setting the vehicle in motion. Due to the temporary deactivation of cancellation conditions, the emergency brake assistance system 10 according to the invention can intervene in these situations without putting the overall safety concept necessary for emergency brake systems at risk. The time duration of a temporary deactivation of a safety concept of an emergency brake system can be approximately 1-3 seconds. Other time periods are also possible, depending on the system design. After the time period has elapsed, the cancellation condition(s) is/are again activated. If an erroneous activation occurs, the acceleration or cancellation intention of the driver is only suppressed for this restricted time period and can be immediately implemented after the time period has elapsed. As a result, the availability of the emergency brake system is extended significantly to cover the situation described.

The temporary deactivation of the cancellation and activation-suppression condition can be implemented continuously or only in certain driving situations (such as situations of setting the vehicle in motion). For implementation with a conditional deactivation in situations of setting the vehicle in motion, a situation in which the vehicle is set in motion is recognized, for example, by interpreting that the vehicle is to be set in motion when the vehicle is at a standstill or below a low speed threshold with non-negative acceleration (no deceleration) of the vehicle. For this purpose, the current longitudinal acceleration ax and the current longitudinal speed vx are conveyed to the emergency brake assistance system 10. The data, ax and vx, can for example be made available by other ECUs in the vehicle, such as ABS or ESP, via a vehicle bus. As soon as the conditions vx<speed threshold and ax≥0 have been fulfilled, the emergency brake assistance system 10 can assume a situation in which the vehicle is to be set in motion. As an option, the start of the driver's intention to accelerate (positive accelerator pedal gradient), which can in particular be derived from the data of the accelerator pedal sensor system 16, can be incorporated into the recognition of a situation in which the vehicle is to be set in motion, in order to ensure a particularly reliable and safe recognition by the emergency brake assistance system 10 of a situation in which the vehicle is to be set in motion. If the emergency brake assistance system 10 recognizes a situation in which the vehicle is to be set in motion, it can output a deactivation signal 34 which can be conveyed to an emergency brake system in order to temporarily switch off a cancellation and activation-suppression condition, thus avoiding a situation in which an emergency braking procedure cannot be implemented when the vehicle is set in motion. As an additional safety criterion, the temporary shutdown or switching-off of the cancellation and activation-suppression condition cannot be conducted when an emergency brake situation (not a situation in which the vehicle is set in motion) occurs, in order not to suppress an intention to cancel the braking in the standard situation. In such cases, the emergency brake assistance system 10 does not output a deactivation signal 34.

For an implementation of the invention, environment sensors with low technical specifications are sufficient, as opposed to standard long-range radar sensors, since the range required is only approx. 1-10 meters. For example, a lidar sensor or a camera is well suited to the purposes of the present invention. As has already been described above, a warning or system intervention information can be given to the driver via a human-machine interface, such as an instrument cluster, especially during and after the intervention. The warning can be acoustic, visual and/or haptic, such as a text message, a symbol which lights up in an instrument, an acoustic alarm and/or vibration of the steering wheel, accelerator or brake pedal.

The present invention assists a driver of a vehicle, in particular embodiments when setting the vehicle in motion, by means of an emergency brake assistance function, so that in particular embodiments in certain traffic situations such as roadworks, rear-end collisions, which predominantly occur as a result of erroneous judgements made by the driver, are prevented.

List of Reference Numerals

10 Emergency brake assistance system
12 Collision risk detection unit
14 Environment sensor system
16 Accelerator sensor system
18 Collision avoidance unit
20 Brake intervention signal
22 Electronic brake system
24 Acceleration block signal
26 Engine control device
28 Visual warning
30 Acoustic warning
32 Haptic warning
34 Deactivation signal

The invention claimed is:

1. An emergency brake assistance system for assisting a driver of a vehicle when setting the vehicle in motion, comprising
    a collision risk detection unit configured to detect a risk of collision with an object in front of the vehicle, based on data from an environment sensor system for recording objects in front of the vehicle and data from an accelerator sensor system for recording an intention to accelerate by the driver, and
    a collision avoidance unit configured to implement measures to prevent a potential collision with the object in front of the vehicle, based on data from the collision risk detection unit, wherein
    the emergency brake assistance system is configured to temporarily implement, for a specified time duration, a temporary deactivation of a cancellation and activation-suppression condition by which an activation of a safety concept of the vehicle can be canceled or suppresses, wherein said temporary deactivation is implemented when recording an intention to accelerate by the driver at a vehicle speed which is lower than a specified speed threshold.

2. A system according to claim 1, characterized in that the collision risk detection unit is configured
    to estimate a vehicle acceleration within an adaptable time frame, based on the data from the accelerator sensor system, and
    to detect the risk of collision with an object in front of the vehicle when the estimated vehicle acceleration gives cause to anticipate that a collision with the object will occur.

3. A system according to claim 1, characterized in that the collision risk detection unit is configured
    to calculate one or more calculated values including a time ttc until an expected collision will occur, a time ttb until a required braking maneuver should be conducted, a time tts until a required steering maneuver should be conducted and/or a necessary deceleration a_nec in order to avoid the expected collision, based on the data from the environment sensor system and the accelerator sensor system, and
    to evaluate the risk of collision with an object in front of the vehicle, based on one or more of these calculated values.

4. A system according to claim 1, characterized in that the collision avoidance unit is configured to implement one or more of the following actions as measures to prevent a potential collision with the object in front of the vehicle:
    output of a brake intervention signal to a trigger an electronic brake system to perform an autonomous time-restricted brake intervention,
    output of an acceleration block signal to trigger an engine control device the suppress of the intention to accelerate by the driver for a restricted period of time,
    output of a visual, acoustic and/or haptic warning for the driver.

5. A system according to claim 4, characterized in that the collision avoidance unit is further configured to output a brake intervention signal with a variable gradient and for a variable target deceleration up to a maximum possible deceleration.

6. A system according to claim 1, further configured to temporarily output a deactivation signal to implement the temporary deactivation of the cancellation and activation-suppression condition, for the specified time duration amounting to approximately 1 to 3 seconds.

7. A system according to claim 6, further configured to only output the deactivation signal when
    the vehicle is at standstill, or
    the vehicle speed is lower than the specified speed threshold and an acceleration of the vehicle is not negative.

8. A system according to claim 6, further configured not to emit the deactivation signal when a negative acceleration of the vehicle is present.

9. In a vehicle having an accelerator pedal by which a driver of said vehicle asserts an intention to accelerate said vehicle, an accelerator pedal sensor connected to said accelerator pedal and configured to output an accelerator pedal signal, an environment sensor arranged and configured to sense a potential obstacle in front of said vehicle and to output an environment sensor signal, an engine for driving said vehicle, a brake for braking said vehicle, a speed sensor to sense a current speed of said vehicle, and at least one safety device including at least one of an electronic brake system configured to actuate said brake, an engine control device configured to control said engine, a visual warning device configured to emit a visual warning to said driver, an acoustic warning device configured to emit an acoustic warning to said driver, and a haptic warning device configured to emit a haptic warning to said driver, an improvement comprising an emergency brake assistance system which comprises:

a collision risk detection unit connected to said environment sensor to receive said environment sensor signal, and connected to said accelerator pedal sensor to receive said accelerator pedal signal, and configured to determine a collision risk of a potential collision with said potential obstacle based on at least said environment sensor signal and said accelerator pedal signal; and a collision avoidance unit connected to an output of said collision risk detection unit, and configured to produce, at least one output connected to said at least one safety device, at least one collision avoidance signal based on said collision risk, so as to actuate said at least one safety device to prevent or reduce a severity of said potential collision with said potential obstacle;

wherein said emergency brake assistance system is configured to implement an override condition based on certain values of said accelerator pedal signal indicating an intention of said driver to override said collision avoidance signal, so as not to actuate or to stop actuating said at least one safety device, and wherein said emergency brake assistance system is further configured to temporarily deactivate, for a specified time duration, said override condition when at least the following deactivation conditions pertain:

a) said accelerator pedal signal indicates an intention of said driver to accelerate said vehicle, and b) said current speed of said vehicle is below a specified speed threshold.

10. The improvement in the vehicle according to claim 9, wherein said emergency brake assistance system is configured to temporarily deactivate said override condition only when said deactivation conditions pertain.

11. The improvement in the vehicle according to claim 9, wherein said specified time duration is in a range from 1 to 3 seconds beginning when said accelerator pedal signal indicates said intention of said driver to accelerate said vehicle.

12. The improvement in the vehicle according to claim 9, wherein said emergency brake assistance system is configured to output a deactivation signal to temporarily deactivate said override condition when said deactivation conditions pertain.

13. The improvement in the vehicle according to claim 9, wherein said vehicle further includes an acceleration sensor to sense a current acceleration of said vehicle, and wherein said deactivation conditions further include:

c) said current acceleration of said vehicle is non-negative.

14. The improvement in the vehicle according to claim 9, wherein said current speed must be zero for said current speed to be below said specified speed threshold.

* * * * *

UNITED STATES PATENT AND TRADEMARK OFFICE
CERTIFICATE OF CORRECTION

PATENT NO. : 8,942,904 B2  
APPLICATION NO. : 13/514375  
DATED : January 27, 2015  
INVENTOR(S) : Foerster et al.

Page 1 of 1

It is certified that error appears in the above-identified patent and that said Letters Patent is hereby corrected as shown below:

In the Specification

Column 6,  
Line 2, after "brake", replace "system" by --systems--;

In the Claims

Column 7,  
Line 66, after "or", replace "suppresses" by --suppressed--;

Column 8,  
Line 29, after "signal to", delete "a";  
Line 33, after "device", replace "the" by --to--;  
Line 33, after "suppress", delete "of";  
Line 49, after "is at", insert --a--;

Column 9,  
Line 15, before "at least", insert --at--.

Signed and Sealed this  
Second Day of June, 2015

Michelle K. Lee  
*Director of the United States Patent and Trademark Office*